United States Patent
Sato

(10) Patent No.: US 8,116,583 B2
(45) Date of Patent: Feb. 14, 2012

(54) LIGHT MODULATION PANEL AND IMAGING LENS

(75) Inventor: Kenichi Sato, Saitama (JP)

(73) Assignee: Fujifilm Corporation, Tokyo (JP)

(*) Notice: Subject to any disclaimer, the term of this patent is extended or adjusted under 35 U.S.C. 154(b) by 0 days.

(21) Appl. No.: 13/092,515

(22) Filed: Apr. 22, 2011

(65) Prior Publication Data
US 2011/0261468 A1    Oct. 27, 2011

(30) Foreign Application Priority Data
Apr. 23, 2010    (JP) ................................. 2010-099544

(51) Int. Cl.
*G06K 9/40*    (2006.01)
*G02B 15/14*    (2006.01)

(52) U.S. Cl. ........ 382/255; 382/254; 382/260; 382/266; 382/268; 382/274; 382/275; 359/554; 359/557; 359/672; 359/676; 359/713; 359/714; 359/715; 359/683; 359/684; 359/685; 359/813; 359/827; 359/828

(58) Field of Classification Search .................. 359/237, 359/554, 557, 672–677, 683–692, 708, 713–715, 359/813, 827, 828; 382/254, 255, 260, 266, 382/268, 274, 275
See application file for complete search history.

(56) References Cited

U.S. PATENT DOCUMENTS

| | | | | |
|---|---|---|---|---|
| 5,756,981 | A * | 5/1998 | Roustaei et al. | 235/462.42 |
| 5,786,582 | A * | 7/1998 | Roustaei et al. | 235/462.07 |
| 7,469,202 | B2 * | 12/2008 | Dowski et al. | 359/637 |
| 7,944,467 | B2 * | 5/2011 | Silveira et al. | 382/117 |
| 2010/0110233 | A1 | 5/2010 | Ohara et al. | |

FOREIGN PATENT DOCUMENTS
JP    2010-110233 A    5/2010
* cited by examiner

*Primary Examiner* — Evelyn A. Lester
(74) *Attorney, Agent, or Firm* — Sughrue Mion, PLLC

(57) ABSTRACT

A light modulation panel is inserted into an optical path of an imaging lens composed of an image-forming optical system to make the imaging lens function as a depth-of-field-extended optical system. The light modulation panel has power that makes a peak position of defocus MTF when the imaging lens is used alone to function as the image-forming optical system and a peak position of defocus MTF when the imaging lens functions as the depth-of-field-extended optical system by insertion of the light modulation panel into the optical path of the imaging lens coincide with each other.

20 Claims, 14 Drawing Sheets

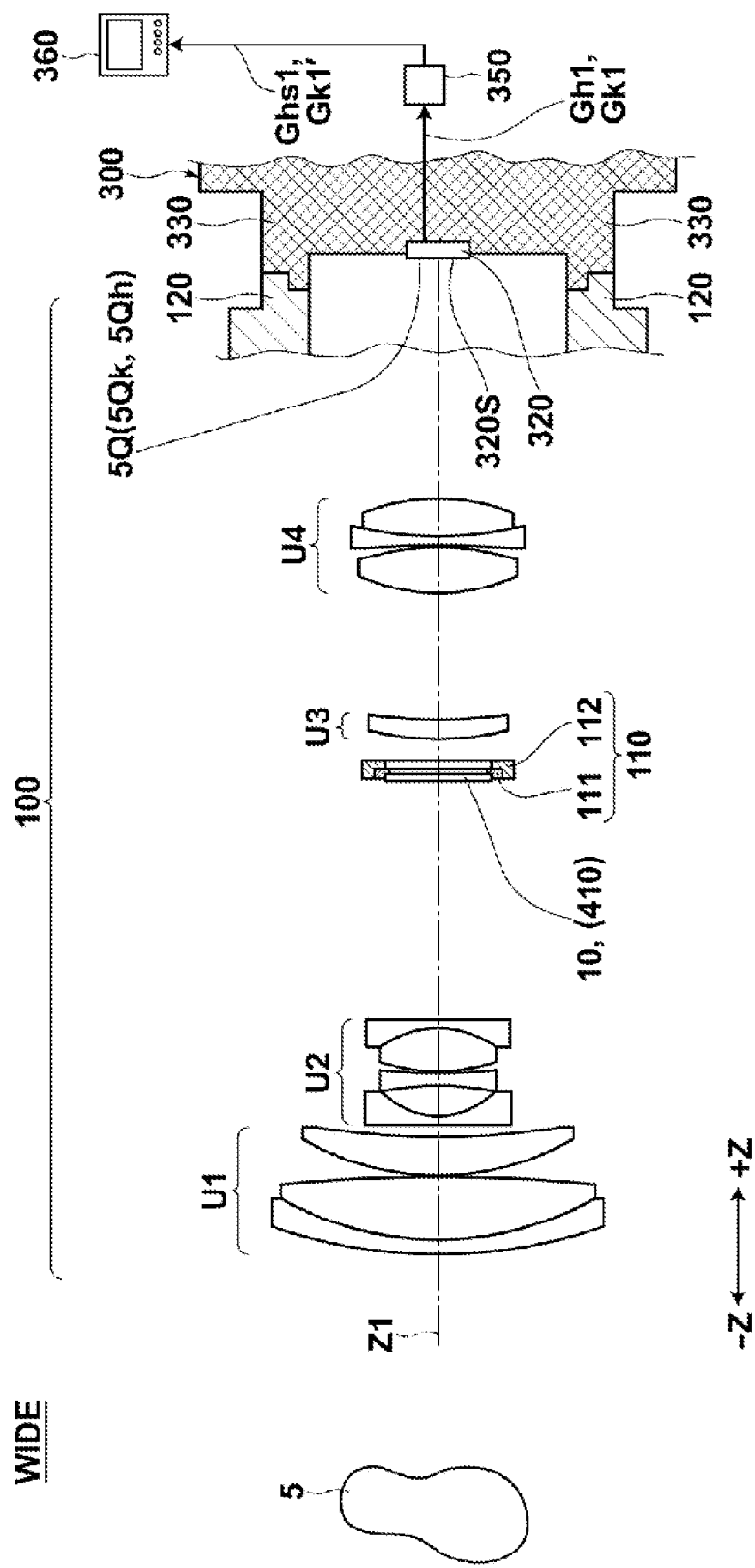

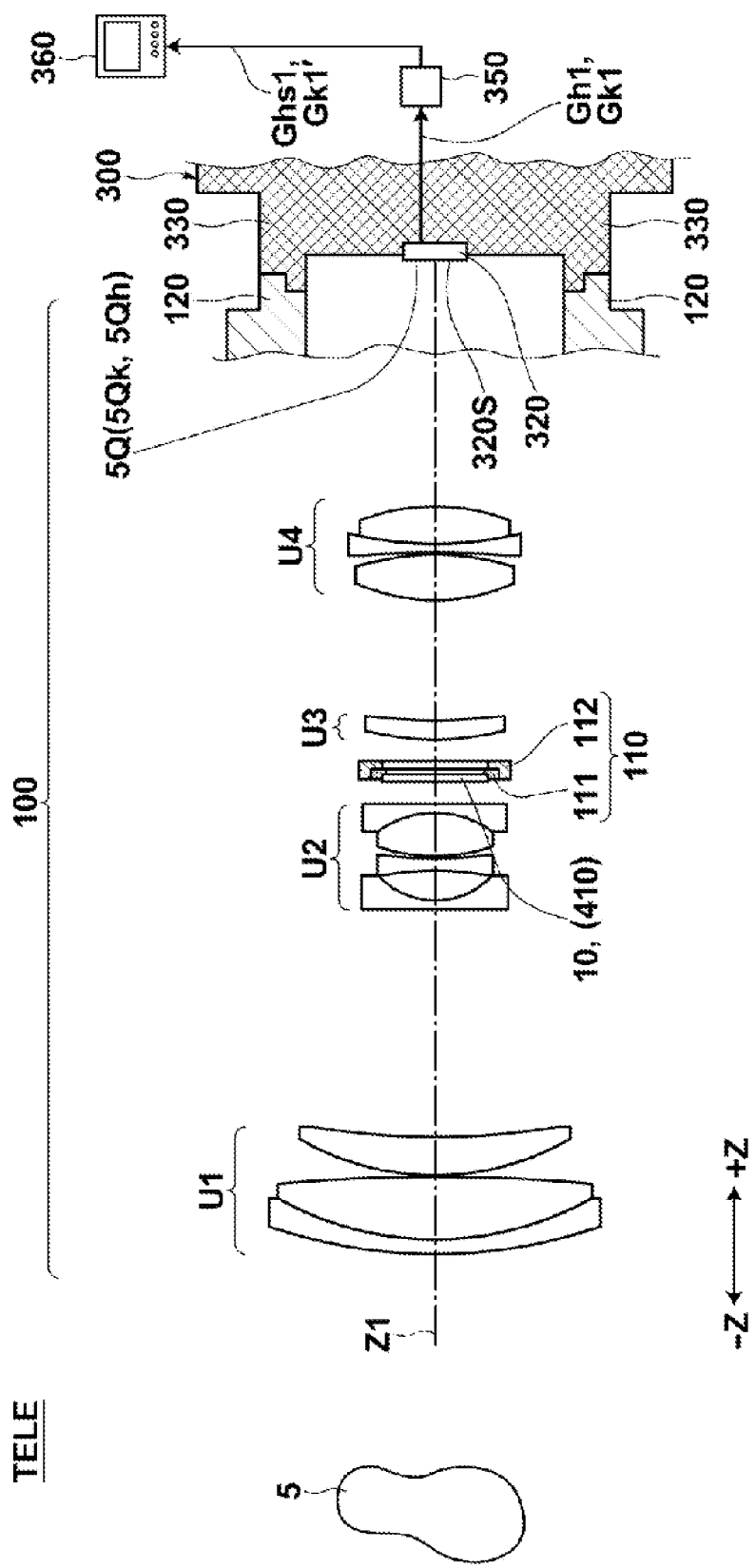

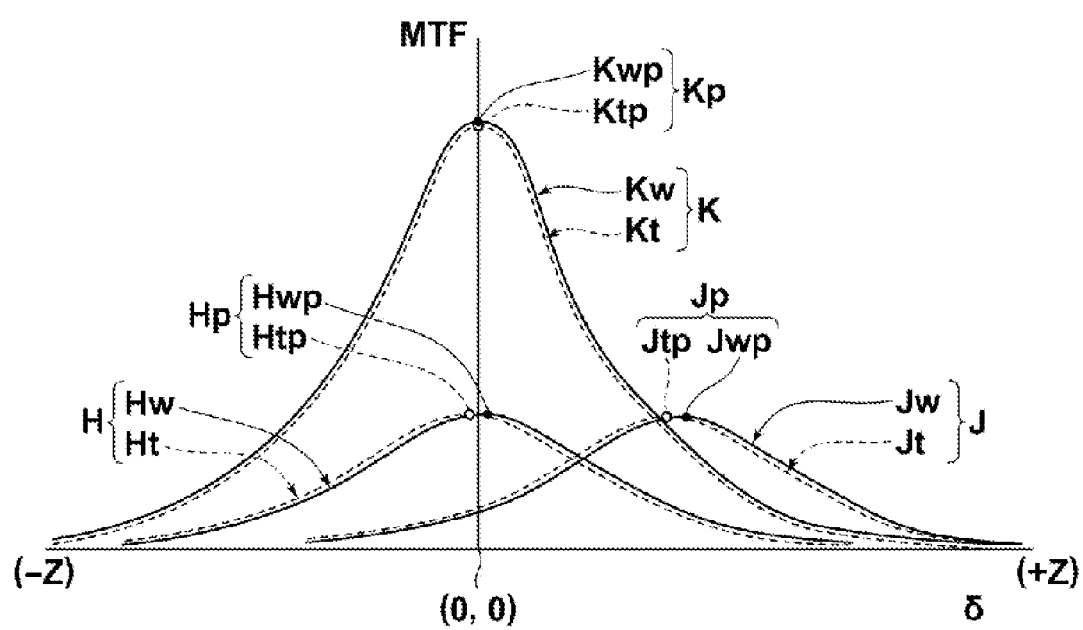

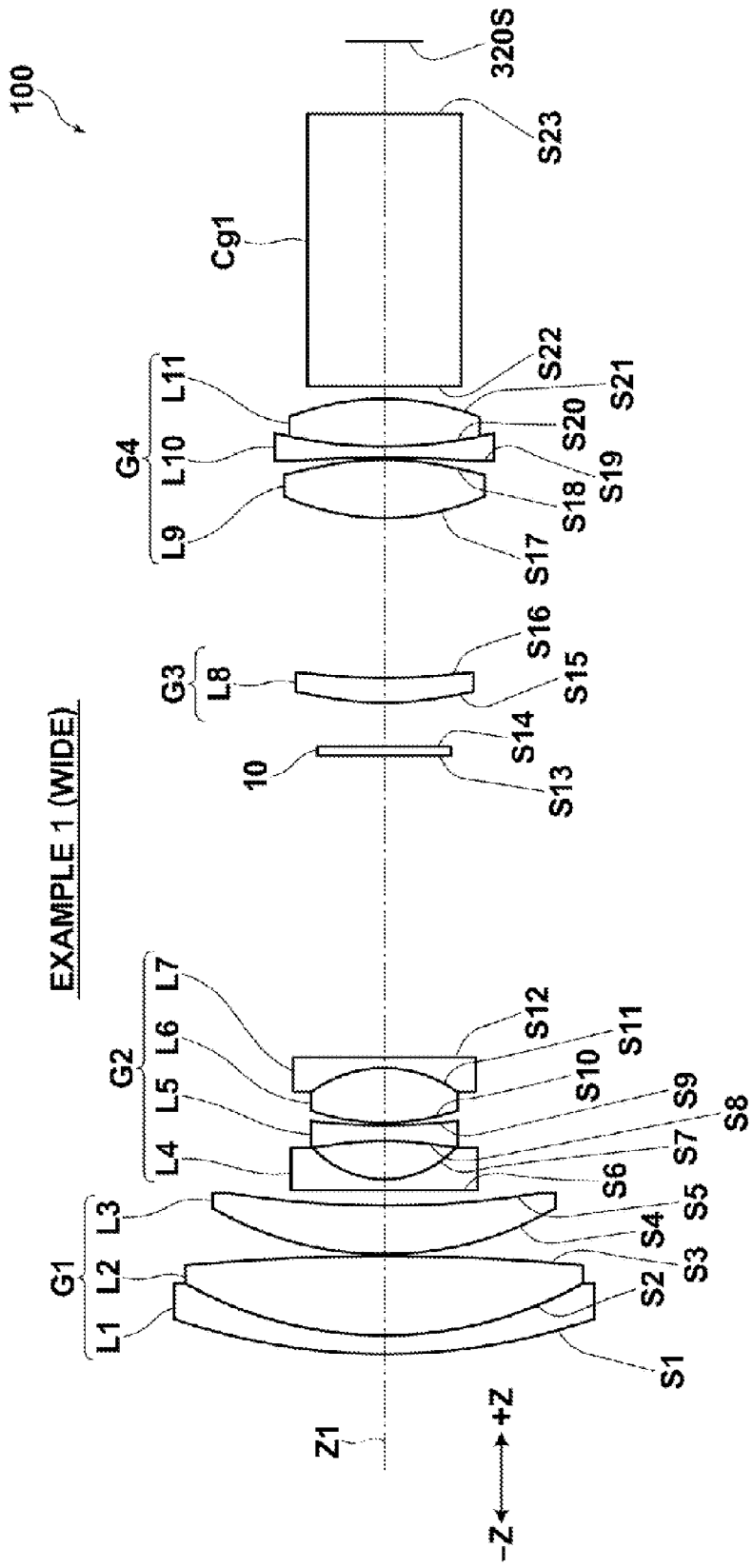

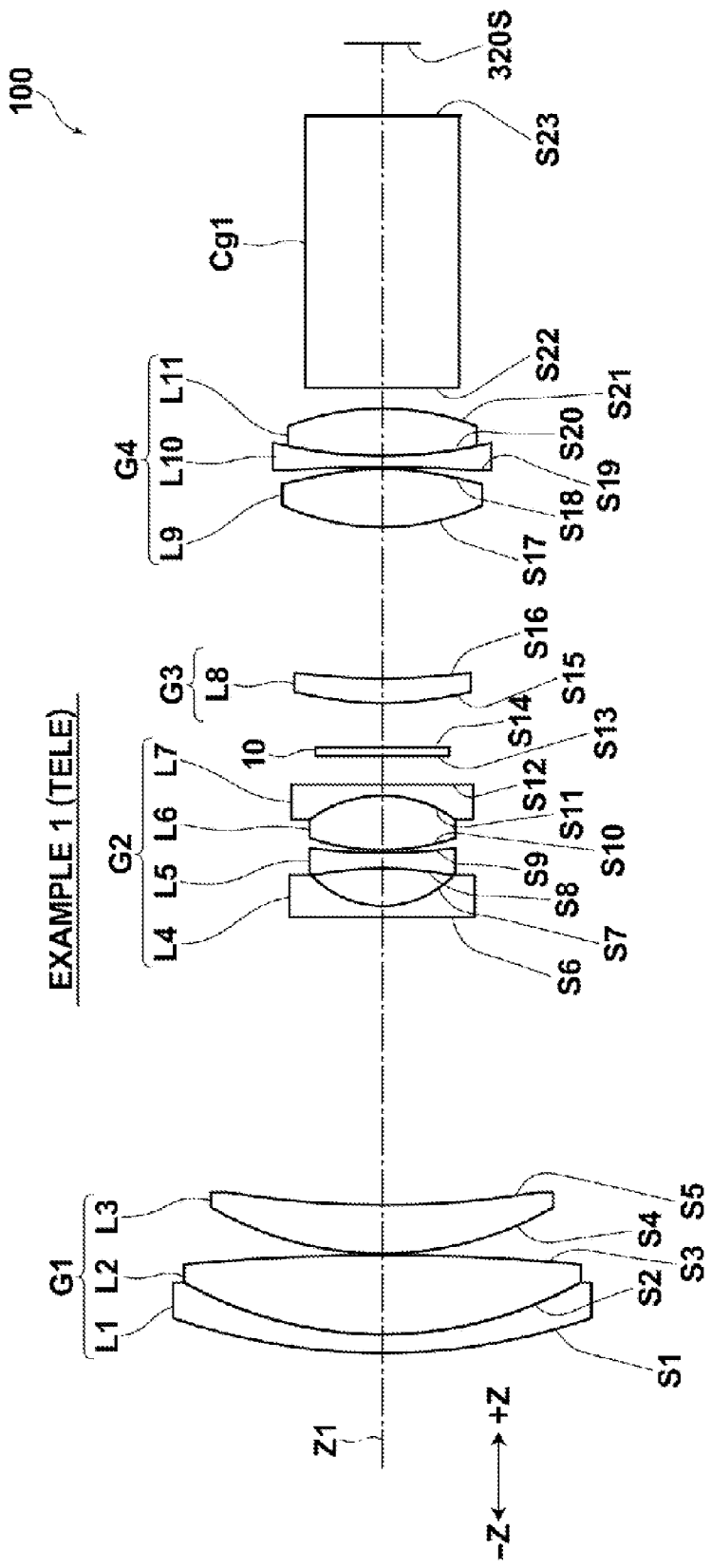

EXAMPLE 1: WIDE ANGLE END, WITHOUT LIGHT MODULATION PANEL

EXAMPLE 1: TELEPHOTO END, WITHOUT LIGHT MODULATION PANEL

EXAMPLE 1: WIDE ANGLE END, WITH LIGHT MODULATION PANEL

WIDE

EXAMPLE 1: TELEPHOTO END, WITH LIGHT MODULATION PANEL

TELE

CHANGE IN PEAK POSITION OF
DEFOCUS MTF WITH RESPECT
TO CHANGE IN CURVATURE RADIUS
OF IMAGE-SIDE SURFACE
OF LIGHT MODULATION PANEL
(SURFACE NUMBER 14)

EXAMPLE 2 (WITHOUT LIGHT MODULATION PANEL)

EXAMPLE 2 (WITH LIGHT MODULATION PANEL)

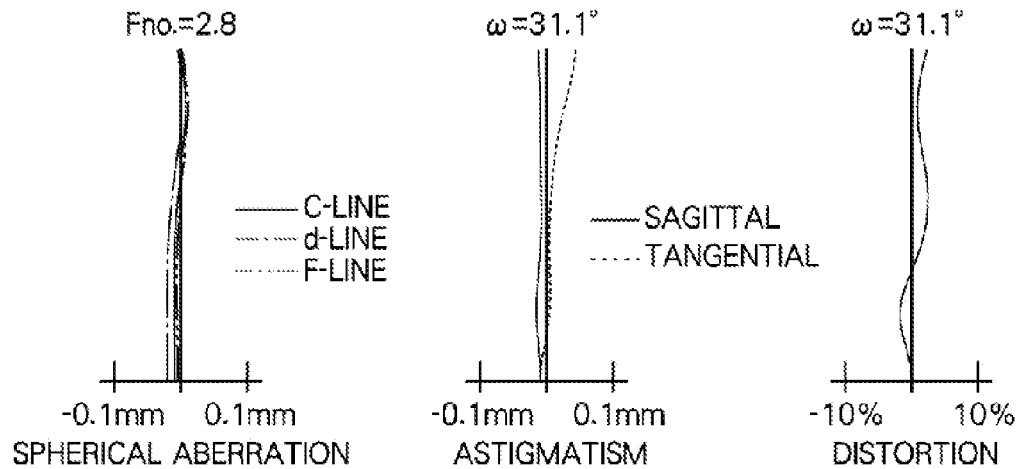
FIG. 10a  FIG. 10b  FIG. 10c
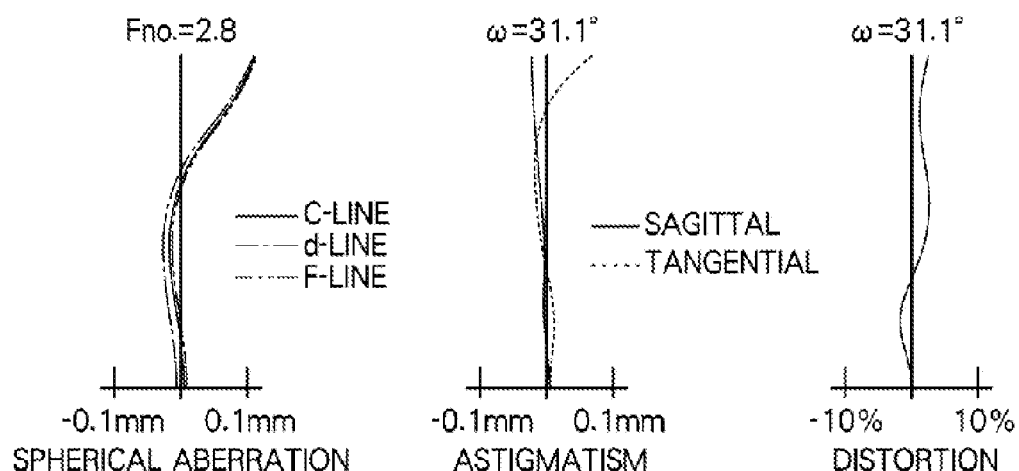
FIG. 11a  FIG. 11b  FIG. 11c

EXAMPLE 2

CENTER ANGLE OF VIEW  50lp/mm

WITHOUT LIGHT
MODULATION PANEL

WITH LIGHT MODULATION
PANEL HAVING NO POWER

WITH LIGHT MODULATION
PANEL HAVING POWER

LIGHT MODULATION PANEL AND IMAGING LENS

BACKGROUND OF THE INVENTION

1. Field of the Invention

The present invention relates to a light modulation panel and an imaging lens. Particularly, the present invention relates to a light modulation panel for making an imaging lens composed of an image-forming optical system function as a depth-of-field-extended optical system, and to the imaging lens in which the light modulation panel is mounted.

2. Description of the Related Art

Conventionally, techniques for correcting a blur in an original image obtained by imaging an optical image to which a blur has been through a depth-of-field-extended optical system are known. The blur is corrected by performing image restoration processing on the blurred original image.

In the image restoration processing, a restoration filter the properties of which are opposite to the blur characteristics of the depth-of-field-extended optical system is applied to the original image to increase the contrast of the original image. Accordingly, an image that would be obtainable by using an imaging lens having a deep depth of field is generated.

When the technique for extending the depth of field is applied, for example, to a monitor or surveillance camera for monitoring the inside of a store or the like, it is possible to monitor a wide range of photography from a short distance to a long distance.

Further, a technique for making an imaging lens composed of an image-forming optical system function as a depth-of-field-extended optical system by inserting a light modulation panel into an optical path of the imaging lens is known. The image-forming optical system is an optical system that forms an optical image representing a subject in such a manner that various aberrations are minimized.

Further, an imaging lens that is composed of an image-forming optical system, and that functions as a depth-of-field-extended optical system when a light modulation panel is inserted into an optical path of the imaging lens, but functions as an image-forming optical system when the light modulation panel is removed therefrom is known (please refer to U.S. Patent Application Publication No. 2010110233). In other words, the imaging lens composed of the image-forming optical system is convertible to the depth-of-field-extended optical system, and vice versa.

When the imaging lens convertible to the image-forming optical system and to the depth-of-field-extended optical system, as described above, is applied to a monitor camera, it is possible to switch operations of the monitor camera based on photography conditions. Specifically, operations are switchable between the case of imaging a subject located at a specific photography distance at extremely high resolution and the case of monitoring a wide range of photography from a short distance to a long distance including the subject at an acceptable level of resolution.

However, when a light modulation panel is simply added to an imaging lens that functions as an image-forming optical system, the imaging lens does not always function as a depth-of-field-extended optical system. In some cases, a desirable image restoration effect is not achievable even if image restoration processing is performed on an original image imaged through the imaging lens into which the light modulation panel has been inserted.

For example, when a light modulation panel is inserted to an optical path of an imaging lens composed of a fixed-focus image-forming optical system to make the imaging lens function as a depth-of-field-extended optical system, if the position of an image plane with respect to the imaging lens is not adjusted in an appropriate manner, it is not always possible to obtain an original image from which a desirable image restoration effect is achievable. For example, when image restoration processing is performed on an original image obtained by imaging a subject located at a short distance and a subject located at a long distance at the same time, an image having a desirable contrast may be restorable with respect to the blurred original image representing the subject located at the long distance but an image having a desirable contrast is not always restorable with respect to the blurred original image representing the subject located at the short distance.

Such a phenomenon occurs, because a position at which an optical image should be imaged when the optical image is formed when the imaging lens functions as the depth-of-field-extended optical system by insertion of the light modulation panel into an optical path of the imaging lens (in other words, the position of an image plane at which an original image from which a desirable image restoration effect is achievable can be obtained) differs from an image formation position of an optical image formed through only the imaging lens composed of the image-forming optical system.

Therefore, there is a demand for imaging an original image from which a desirable image restoration effect is achievable without adjusting an optical system when the optical system is converted from an image-forming optical system without insertion of a light modulation panel into an optical path of the imaging lens to a depth-of-field-extended optical system with insertion of the light modulation panel into the optical path of the imaging lens.

The aforementioned problem is not specific to an imaging lens used in a monitor camera but common to imaging lenses used in general cameras.

For example, with respect to general digital cameras, there is a demand for easily switching operations between the case of obtaining an image representing only a person or people at an extremely high resolution and the case of obtaining an original image from which an image having a deep depth of field, and which represents both a person or people and the background at an acceptable level of resolution, is restorable.

SUMMARY OF THE INVENTION

In view of the foregoing circumstances, it is an object of the present invention to provide a light modulation panel that can easily make an imaging lens composed of an image-forming optical system function as a depth-of-field-extended optical system. Further, it is another object of the present invention to provide an imaging lens into which the light modulation panel is to be inserted.

A light modulation panel according to the present invention is a light modulation panel to be inserted into an optical path of an imaging lens composed of an image-forming optical system to make the imaging lens function as a depth-of-field-extended optical system, wherein the light modulation panel has power that makes a peak position of defocus MTF (modulation transfer function) related to the image-forming optical system when the imaging lens is used alone to function as the image-forming optical system and a peak position of defocus MTF related to the depth-of-field-extended optical system when the imaging lens functions as the depth-of-field-extended optical system by insertion of the light modulation panel into the optical path of the imaging lens coincide with each other.

Specifically, the light modulation panel is inserted into the optical path of the imaging lens to make the imaging lens composed of an image-forming optical system function as a depth-of-field-extended optical system. The light modulation panel has power that makes the peak position of defocus MTF related to the imaging lens functioning as the image-forming optical system without insertion of the light modulation panel and the peak position of defocus MTF related to the imaging lens functioning as the depth-of-field-extended optical system with insertion of the light modulation panel into the optical path of the imaging lens coincide with each other.

The expression "the peak positions coincide with each other" represents not only the case in which the peak positions exactly coincide with each other, but also the case in which the peak position of defocus MTF related to the imaging lens into which the light modulation panel has been inserted and the peak position of defocus MTF related to the imaging lens into which the light modulation panel has not been inserted are located close to each other (coincide with each other) to make the imaging lens function as a depth-of-field-extended optical system that can obtain an original image from which a desirable image restoration effect is achievable.

It is desirable that the light modulation panel is inserted to a position near a pupil of the imaging lens. The expression "a position near a pupil" includes the "position of a pupil".

Further, the expression "a position near a pupil" (a position near the pupil of the imaging lens) means that the width of shift from the position of the pupil is less than or equal to the twice the center thickness of the thinnest lens element in the lens system.

The light modulation panel may be a single lens. The term "single lens" means a single lens, which is not a cemented lens. Therefore, a cemented lens formed by cementing two or more lenses together is not included in the single lens.

Further, the imaging lens of the present invention is an imaging lens in which a light modulation panel is mountable. Further, the imaging lens includes a detachably-holding unit that holds the light modulation panel in a detachable manner.

An imaging lens according to another aspect of the present invention is an imaging lens into which the light modulation panel is mountable, and the imaging lens is a zoom lens.

The imaging lens that is the zoom lens is an imaging lens comprising:

a positive first group that is fixed during zooming;
a negative second group that moves during zooming;
a third group that is fixed during zooming; and
a positive fourth group that moves during zooming, which are arranged from the object point side of the imaging lens in the order mentioned above,
wherein the light modulation panel is mountable between the second group and the third group or in the third group. Further, it is desirable that the imaging lens includes a detachably-holding unit that holds the light modulation panel in a detachable manner.

According to the light modulation panel and the imaging lens of the present invention, the light modulation panel has power that makes the peak position of defocus MTF related to the imaging lens functioning as the image-forming optical system without insertion of the light modulation panel and the peak position of defocus MTF related to the imaging lens functioning as the depth-of-field-extended optical system with insertion of the light modulation panel into the optical path of the imaging lens coincide with each other. Therefore, it is possible to easily make the imaging lens functioning as the image-forming optical system function as a depth-of-field-extended optical system that can obtain an original image from which a desirable image restoration effect is achievable.

Conventionally, when a light modulation panel is simply inserted into the optical path of an imaging lens, such as a single focus lens and a zoom lens, that functions as an image-forming optical system to make the imaging lens function as a depth-of-field-extended optical system, the peak position of defocus MTF when the imaging lens functions as the image-forming optical system by using the imaging lens alone without insertion of the light modulation panel and the peak position of defocus MTF when the imaging lens functions as the depth-of-field-extended optical system with insertion of the light modulation panel differ from each other. Therefore, it has been necessary to correct the difference (shift) in the peak positions, for example, by adjusting the position of the image plane with respect to the imaging lens.

However, the light modulation panel of the present invention has power that makes the peak position of defocus MTF when the imaging lens functions as the image-forming optical system by using the imaging lens alone without the light modulation panel and the peak position of defocus MTF when the imaging lens functions as the depth-of-field-extended optical system by insertion of the light modulation panel into the optical path of the imaging lens coincide with each other. Therefore, it is possible to make the peak position of defocus MTF when the imaging lens functions as the image-forming optical system and the peak position of defocus MTF when the imaging lens functions as the depth-of-field-extended optical system coincide with each other without adjusting the position of the image plane or the like.

Therefore, when a blurred original image is obtained by imaging while the imaging lens functions as the depth-of-field-extended optical system by insertion of the light modulation panel into the imaging lens, it is possible to perform imaging with the image plane positioned at the peak position of the defocus MTF. Hence, it is possible to obtain an image the contrast of which is higher than that of an image (original image) obtained by imaging with the image plane positioned at a different position, which is not the peak position of defocus MTF. When image restoration processing is performed on the original image the contrast of which is higher, it is possible to easily enhance the contrast of the original image to a predetermined level or higher.

Therefore, it is possible to easily make the imaging lens composed of the image-forming optical system function as a depth-of-field-extended optical system that can obtain an original image from which a desirable image restoration effect is achievable.

The light modulation panel, as described above, may be applied also to an imaging lens composed of an existing image-forming optical system. Specifically, when the newly designed light modulation panel of the present invention is applied to a generally available imaging lens, it is possible to easily make the imaging lens function as a depth-of-field-extended optical system.

As an existing product, a telephoto lens into which a filter having power is inserted is known. However, the telephoto lens does not function both as an image-forming optical system and as a depth-of-field-extended optical system by attachment and detachment of the filter. Therefore, the telephoto lens is completely different from the imaging lens or apparatus, as described above, which can obtain an original image from which a desirable image restoration effect is achievable.

BRIEF DESCRIPTION OF THE DRAWINGS

FIG. 1A is a cross section illustrating a state in which a light modulation panel is inserted into an imaging lens set to wide angle end according to an embodiment of the present invention;

FIG. 1B is a cross section illustrating a state in which a light modulation panel is inserted into an imaging lens set to telephoto end according to an embodiment of the present invention;

FIG. 2 is a diagram illustrating curves representing defocus MTF when a light modulation panel is attached to an imaging lens or detached from the imaging lens;

FIG. 3A is a cross section illustrating a state in which a light modulation panel has been inserted into an imaging lens of Example 1 that is set to wide angle end;

FIG. 3B is a cross section illustrating a state in which the light modulation panel has been inserted into the imaging lens of Example 1 that is set to telephoto end;

FIG. 4Ab is a diagram illustrating astigmatism of the imaging lens in Example 1 that is set to wide angle end without a light modulation panel;

FIG. 4Ac is a diagram illustrating distortion of the imaging lens in Example 1 that is set to wide angle end without a light modulation panel;

FIG. 4Bb is a diagram illustrating astigmatism of the imaging lens in Example 1 that is set to telephoto end without a light modulation panel;

FIG. 4Bc is a diagram illustrating distortion of the imaging lens in Example 1 that is set to telephoto end without a light modulation panel;

FIG. 5Ab is a diagram illustrating astigmatism of the imaging lens in Example 1 that is set to wide angle end with a light modulation panel mounted therein;

FIG. 5Ac is a diagram illustrating distortion of the imaging lens in Example 1 that is set to wide angle end with a light modulation panel mounted therein;

FIG. 5Bb is a diagram illustrating astigmatism of the imaging lens in Example 1 that is set to telephoto end with a light modulation panel mounted therein;

FIG. 5Bc is a diagram illustrating distortion of the imaging lens in Example 1 that is set to telephoto end with a light modulation panel mounted therein;

FIG. 6Ab is a diagram illustrating a defocus MTF curve of the imaging lens in Example 1 that is set to wide angle end with a light modulation panel having no power;

FIG. 6Ac is a diagram illustrating a defocus MTF curve of the imaging lens in Example 1 that is set to wide angle end with a light modulation panel having power;

FIG. 6Bb is a diagram illustrating a defocus MTF curve of the imaging lens in Example 1 that is set to telephoto end with a light modulation panel having no power;

FIG. 6Bc is a diagram illustrating a defocus MTF curve of the imaging lens in Example 1 that is set to telephoto end with a light modulation panel having power;

FIG. 10a is a diagram illustrating spherical aberration of the single-focus imaging lens in Example 2 without a light modulation panel;

FIG. 10b is a diagram illustrating astigmatism of the single-focus imaging lens in Example 2 without a light modulation panel;

FIG. 10c is a diagram illustrating distortion of the single-focus imaging lens in Example 2 without a light modulation panel;

FIG. 11a is a diagram illustrating spherical aberration of the single-focus imaging lens in Example 2 with a light modulation panel inserted therein;

FIG. 11b is a diagram illustrating astigmatism of the single-focus imaging lens in Example 2 with a light modulation panel inserted therein;

FIG. 11c is a diagram illustrating distortion of the single-focus imaging lens in Example 2 with a light modulation panel inserted therein;

DESCRIPTION OF THE PREFERRED EMBODIMENTS

Figure 4A:
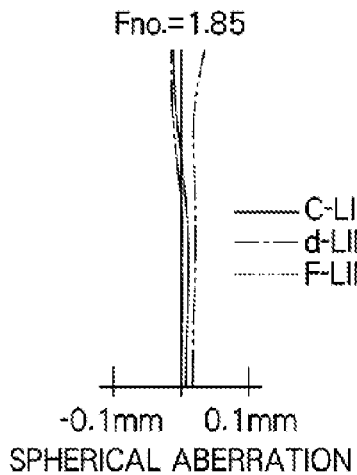
FIG. 4Aa is a diagram illustrating spherical aberration of the imaging lens in Example 1 that is set to wide angle end without a light modulation panel.
Figure 4A:
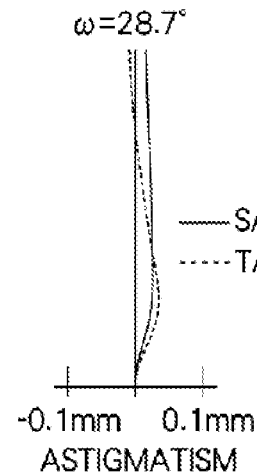
Figure 4A:
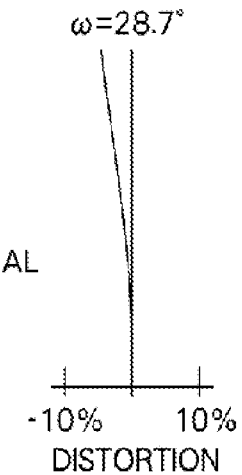

Hereinafter, embodiments of the present invention will be described with reference to drawings. FIGS. 1A and 1B are diagrams illustrating light modulation panels according to an embodiment of the present invention and imaging lenses that are zoom lenses. FIG. 1A illustrates a state in which a light modulation panel is arranged in an imaging lens that is set to wide angle end. FIG. 1B illustrates a state in which a light modulation panel is arranged in an imaging lens that is set to telephoto end. FIG. 2 is a diagram plotting curves representing defocus MTF on coordinates defined by the vertical axis representing values of MTF and the horizontal axis representing defocus amount δ.

An imaging lens 100 of the present invention is a zoom lens composed of an image-forming optical system for forming an optical image representing a subject in such a manner that various aberrations are minimized. The imaging lens 100 forms optical image 5Q representing a subject 5 on an image plane 320S of an imaging device 320, and a light modulation panel 10 is mountable in an optical path of the imaging lens 100.

The light modulation panel 10 of the present invention is inserted into the optical path of the imaging lens 100 to make the imaging lens 100 composed of an image-forming optical system function as a depth-of-field-extended optical system. In other words, an optical system in which the imaging lens 100, which is the image-forming optical system, and the light modulation panel 10 are used in combination functions as a depth-of-field-extended optical system.

The light modulation panel 10 has power that makes peak position Kp of defocus MTF (curve K in FIG. 2) related to the image-forming optical system when the imaging lens 100 is used alone to function as the image-forming optical system without insertion of the light modulation panel 10 and peak position Hp of defocus MTF (curve H in FIG. 2) related to the depth-of-field-extended optical system when the imaging lens 100 functions as the depth-of-field-extended optical system by insertion of the light modulation panel 10 into the optical path of the imaging lens 100 coincide with each other.

In FIG. 2, curve K represents defocus MTF related to the imaging lens 100 in which the light modulation panel 10 is not arranged (MTF related to the image-forming optical system). The curve K represents both of curve Kt and curve Kw, which will be described later. The curve Kt represents defocus MTF when the imaging lens 100 in which the light modulation panel 10 is not arranged is set to telephoto end. The curve Kw represents defocus MTF when the imaging lens 100 in which the light modulation panel 10 is not arranged is set to wide angle end. Further, the peak position of the curve Kt (peak position of defocus MTF) is represented by Ktp, and the peak position of the curve Kw (peak position of defocus MTF) is represented by Kwp.

Further, curve H in FIG. 2 represents defocus MTF related to the imaging lens 100 in which the light modulation panel 10 is arranged (MTF related to the depth-of-field-extended optical system). The curve H represents both of curve Ht and curve Hw, which will be described later. The curve Ht represents defocus MTF when the imaging lens 100 in which the light modulation panel 10 is arranged is set to telephoto end. The curve Hw represents defocus MTF when the imaging lens 100 in which the light modulation panel 10 is arranged is set to wide angle end. Further, the peak position of the curve Ht (peak position of defocus MTF) is represented by Htp, and the peak position of the curve Hw (peak position of defocus MTF) is represented by Hwp.

The curve representing defocus MTF shows changes in the value of MTF measured while a position at which an optical image formed through the image-forming optical system, the depth-of-field-extended optical system or the like is detected is moved in the direction of the optical axis with respect to the imaging lens.

The defocus MTF is measured on the optical axis.

In FIG. 2, a base detection position at which the defocus amount δ becomes ±0 is set so as to coincide with the peak position Kp of the curve K representing the defocus MTF. The base detection position coincides with the position of an image plane 320S of an imaging device 320, which will be described later.

When a distance between the imaging lens 100 and a detection position in the direction of optical axis Z1 is longer than a distance between the imaging lens 100 and the base detection position, the defocus amount δ is a positive value (+). When a distance between the imaging lens 100 and a detection position in the direction of the optical axis Z1 is shorter than the distance between the imaging lens 100 and the base detection position, the defocus amount δ is a negative value (−).

In FIGS. 1A and 16, the light modulation panel 10 is a single lens. FIGS. 1A and 1B illustrate a state in which the light modulation plate 10 is inserted to a position near a pupil of the imaging lens 100.

Further, the imaging lens 100 includes a detachably-holding unit 100 for detachably holding the light modulation panel 10 in an optical path of the imaging lens 100.

The detachably-holding unit 110 may adopt a known attaching/detaching mechanism, such as a screw type and a bayonet type.

For example, a lens frame 111 for holding the light modulation panel 10 is prepared. The lens frame 111 has a male screw formed on the external surface of the cylindrical frame, and holds the light modulation panel 10 in the cylindrical frame. Further, a holder 112 is arranged on the imaging lens 100 side. The holder 112 has a female screw formed on the internal surface thereof.

While the light modulation panel 10 is held in the lens frame 111, the male screw formed on the external surface of the lens frame 111 is screwed with the female screw formed on the internal surface of the holder 112 to fix the lens frame 111 to the imaging lens 100. Accordingly, it is possible to mount the light modulation panel 10 in the imaging lens 100. When the lens frame 111 is removed from the imaging lens 100 by loosening the screws, the light modulation panel 10 can be removed from the imaging lens 100. As described above, it is possible to hold the light modulation panel 10 in a detachable manner with respect to the imaging lens 100.

As described above, the detachably-holding unit 110 may be composed of the lens frame 111 and the holder 112.

When the lens frame 111 holds the light modulation panel 10, the light modulation panel 10 may be fixed to the lens frame 111, for example, by using an adhesive.

Further, the imaging lens 100 that is a zoom lens is composed of positive first group U1 that is fixed during zooming, negative second group U2 that moves during zooming, third group U3 that is fixed during zooming, and positive fourth group U4 that moves during zooming, which are arranged from the object point side of the imaging lens in the order mentioned above. Further, the light modulation panel 10 is arranged between the second lens group U2 and the third lens group U3 or in the third lens group U3 in a detachable manner.

FIGS. 1A and 1B illustrate a state in which the light modulation panel 10 is mounted in the third lens group U3.

An imaging device 320 is arranged in an imaging unit 300. Further, an imaging mount unit 330 is formed in the imaging unit 300. The imaging mount unit 330 is a base for positioning when the imaging lens 100 is attached to the imaging unit 300.

Meanwhile, a lens mount unit 120 is formed in the imaging lens 100. The lens mount unit 120 is a base for positioning when the imaging lens 100 is attached to the imaging unit 300.

When the lens mount unit 120 is attached to the imaging mount unit 330, the imaging lens 100 and the imaging unit 300 are correctly positioned with respect to each other.

When the lens mount unit 120 is attached to the imaging mount unit 330, a screw method or a bayonet method may be adopted.

As describe above, the imaging lens 100 and the imaging unit 300 are designed so that the position of the imaging lens 100 with respect to the image plane 320S of the imaging device 320 becomes a base detection position, at which the defocus amount δ becomes ±0, when the imaging lens 100 is correctly positioned with respect to the imaging unit 300.

When the imaging lens 100 is correctly positioned with respect to the imaging unit 300, the value of MTF of an optical image formed on the image plane 320S of the imaging device 320 (at a position with the defocus amount of ±0) through only the imaging lens 100 corresponds to the value of MTF at the peak position Kp of the curve K representing the defocus MTF in FIG. 2.

An image processing unit 350 performs image restoration processing on image data representing an image obtained by the imaging device 320 by imaging optical image 5Q formed on the image plane 320S. Further, the image processing unit 350 performs ordinary image processing, which does not include the image restoration processing.

A display unit 360 displays an image representing image data on which image processing has been performed by the image processing unit 350.

More specifically, when the light modulation panel 10 is mounted in the imaging lens 100 to make the imaging lens 100 function as a depth-of-field-extended optical system, image Gh1 representing image data obtained by the imaging device 320 by imaging optical image 5Qh formed on the image plane 320S represents the optical image 5Qh to which a blur has been given by the light modulation panel 10.

Image data representing the blurred image Gh1 are input to the image processing unit 350, and the image processing unit 350 performs image restoration processing on the image data representing the image Gh1 to generate restored image Ghs1, in which the contrast of the image Gh1 has been enhanced. Image data representing the restored image Ghs1 output from the image processing unit 350 are input to the display unit 360, and an image is displayed.

When the imaging lens 100 functions as the image-forming optical system without mounting the light modulation panel 10, image data representing image Gk1 obtained by the imaging device 320 by imaging optical image 5Qk formed on the image plane 320S represents the optical image 5Qk, which is an in-focus image having high contrast. The image processing unit 350 performs ordinary image processing on image data representing the image Gk1 without performing image restoration processing. Image data representing image Gk1' are output from the image processing unit 350 after ordinary image processing is performed. Further, the image Gk1' represented by the output image data is displayed at the display unit 360.

As the image restoration processing, a conventionally known method may be adopted.

If the light modulation panel 10 is inserted to an optical path of the imaging lens 100, the imaging lens 100 functions as the depth-of-field-extended optical system. When the position at which the light modulation panel 10 is inserted is near a pupil of the imaging lens 100, or exactly at the position of the pupil of the imaging lens 100, it is possible to make the imaging lens 100 function as the depth-of-field-extended optical system in a more effective manner.

Further, it is not necessary that the light modulation panel 10 is a single lens. The light modulation panel 10 may be composed of plural lenses. For example, the light modulation panel 10 may be a cemented lens. In other words, the light modulation panel 10 may be a single lens, a cemented lens, or the like.

Next, with reference to FIG. 2 and the like, the actions of the light modulation panel 10 and the imaging lens 100 will be described.

When the light modulation panel 10 is not arranged in the imaging lens 100, the imaging lens 100 functions as the image-forming optical system. When the imaging lens 100 that is a zoom lens functions as the image-forming optical system, the defocus MTF is as indicated by curve K (curve Kt when the imaging lens 100 is set to telephoto end, and curve Kw when the imaging lens 100 is set to wide angle end) in FIG. 2. Further, the peak position Kp (peak position Ktp when the imaging lens 100 is set to telephoto end, and peak position Kwp when the imaging lens 100 is set to wide angle end) of the curve K (Kt, Kw) is the position at the defocus amount δ becomes ±0.

In contrast, when the light modulation panel 10 is arranged in the imaging lens 100, the imaging lens 100 functions as the depth-of-field-extended optical system. When the imaging lens 100 in which the light modulation panel 10 having power is arranged functions as the depth-of-field-extended optical system, the defocus MTF is as indicated by curve H (curve Ht when the imaging lens 100 is set to telephoto end, and curve Hw when the imaging lens 100 is set to wide angle end) in FIG. 2. Further, the peak position Hp (peak position Htp when the imaging lens 100 is set to telephoto end, and peak position Kwp when the imaging lens 100 is set to wide angle end) of the curve H (Ht, Hw) is the position at the defocus amount δ becomes approximately ±0.

Here, the peak position Htp when the imaging lens 100 is set to telephoto end and the peak position Hwp when the imaging lens 100 is set to wide angle end are slightly shifted from the position at which the defocus amount δ becomes ±0. However, the value of MTF at a position at which the defocus amount δ becomes ±0 is substantially the same as the values of MTF at the peak positions Htp, Hwp. Therefore, it is possible to make the imaging lens 100 in which the light modulation panel 10 is arranged function as a depth-of-field-extended optical system that can obtain an original image from which a desirable image restoration effect is achievable.

Specifically, when image restoration processing is performed on an original image imaged through the imaging lens 100 in which the light modulation panel 10 is arranged, it is possible to easily increase the value of MTF (contrast) related to the original image to a predetermined MTF value (contrast) or higher.

When imaging is performed by the imaging lens 100 in which the light modulation panel 10 is mounted, and which is attached to the imaging unit 300 in such a manner that the image plane 320S is arranged at a base position at which the defocus amount δ becomes, ±0, and image restoration processing is performed on an image obtained by imaging to obtain a restored high-contrast image, the slight difference in the peak position of the defocus MTF, as described above, does not substantially affect the image quality of the restored image. Therefore, it is possible to easily make the imaging lens 100 that is an image-forming optical system function as the depth-of-field extended optical system.

In contrast, when a conventional light modulation panel 410 that does not have predetermined power is arranged in the imaging lens 100, defocus MTF is as indicated by curve J (curve Jt when the imaging lens 100 is set to telephoto end, and curve Jw when the imaging lens 100 is set to wide angle end). Peak position Jp (peak position Jtp when the imaging lens 100 is set to telephoto end, and peak position Jwp when the imaging lens 100 is set to wide angle end) of the curve J (curves Jt, Jw) greatly shifts, toward the positive direction (+), from the position at which the defocus amount δ is +0.

Therefore, the value of MTF at the position at which the defocus amount δ is ±0 is greatly lower than the value of MTF when the aforementioned light modulation panel 10 having the predetermined power is arranged.

When a restored image is obtained by performing image restoration processing on an image obtained by the imaging device 320 the image plane 320S of which is located at a position with the defocus amount δ of ±0, the image quality of the restored image is greatly lower.

As described above, when the conventional light modulation panel 410 that does not have predetermined power is arranged in the imaging lens 100, it is impossible to make the imaging lens 100 in which the light modulation panel 410 is arranged function as the depth-of-field-extended optical system. Specifically, the light modulation panel 410 that does not have predetermined power does not easily make the imaging lens 100, which is the image-forming optical system, function as the depth-of-field-extended optical system.

Figure 7:
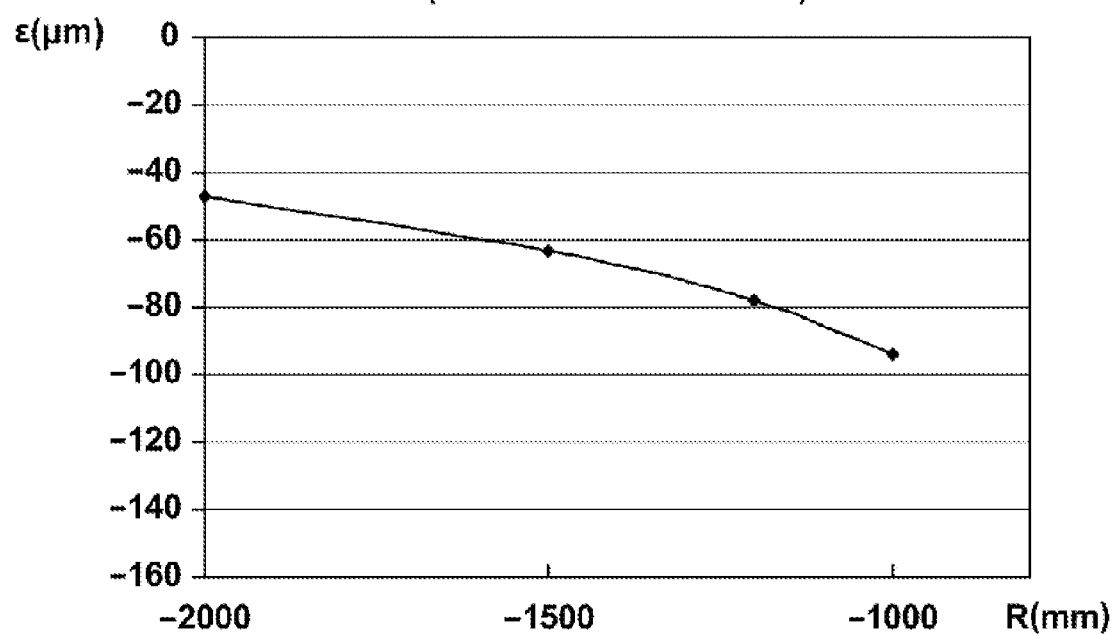
FIG. 7 is a diagram illustrating a change in the peak position of defocus MTF based on a change in the radius of curvature of the light modulation panel.

FIG. 7 is a diagram illustrating peak position move amount $\epsilon$, which is a change in the peak position of defocus MTF that changes based on a change in the radius of curvature of an image-point-side lens surface (spherical surface) of a light modulation panel inserted to the imaging lens 100. In FIG. 7, the horizontal axis represents the radius of curvature of the image-point-side lens surface (spherical surface) of the light modulation panel, and the vertical axis represents defocus amount $\epsilon$. In FIG. 7, the peak position of the defocus MTF when the light modulation panel 410 that does not have power is inserted to the imaging lens 100 is a position at which the peak position move amount $\epsilon$ is $\pm 0$ ($\epsilon = \pm 0$).

When the light modulation panel 410 that does not have power is mounted in the imaging lens 100 that is set to "wide angle end", the peak position Jwp of defocus MTF moves by 80 μm toward the direction of +Z (by 80 μm toward the direction in which the defocus amount increases) from the peak position Kwp of the defocus MTF when the light modulation panel 410 is not mounted (please refer to FIG. 2 and FIGS. 6Aa and 6Ab, which will be described later). Further, when the light modulation panel 410 that does not have power is mounted in the imaging lens 100 that is set to "telephoto end", the peak position Jtp of defocus MTF moves by 63 μm toward the direction of +Z (by 63 μm toward the direction in which the defocus amount increases) from the peak position Ktp of the defocus MTF when the light modulation panel 410 is not mounted (please refer to FIG. 2 and FIG. 6Ba and 6Bb, which will be described later).

Therefore, the radius of curvature of the image-point-side lens surface of the light modulation panel 410 should be changed so that the peak position moves only by approximately 71 μm (71 μm≈(80 μm+63 μm)/2) to return to an original position. Specifically, the peak position Jp of the defocus MTF should be moved in the direction of −Z by 71 μm (by 71 μm toward the direction in which the defocus amount decreases).

As readable from FIG. 7, the radius of curvature of the image-point-side surface of the light modulation panel 410 should be set to −1300 mm to move the peak position Jp of the defocus MTF by 71 μm in the direction of −Z (by 71 μm toward the direction in which the defocus amount decreases). In the light modulation panel 10 of the present invention, the radius of curvature of the image-point-side lens surface of the light modulation panel 410 is set to −1300 mm as described above (please refer to the value of the radius of curvature of surface number 14 in table 1A, which will be described later).

Specific Examples

Next, with reference to FIGS. 3A through 7 and Tables 1A, 2A and 3A, Example 1 will be described. Further, with reference to FIGS. 8 through 12c and Tables 1B, 2B and 3B, Example 2 will be described. Example 1 is related to the case of attaching a light modulation panel to an imaging lens composed of a zoom lens and detaching the light modulation panel therefrom. Example 2 is related to the case of attaching a light modulation panel to a single-focus imaging lens and detaching the light modulation panel therefrom. In the following descriptions, when the signs of the imaging lens, the light modulation panel and the like are the same as those illustrated in FIGS. 1A, 1B and 2, which have been described, they represent corresponding elements.

FIGS. 3A and 3B are related to Example 1. FIG. 3A is a cross section schematically illustrating the structure of the imaging lens that is the zoom lens in which a light modulation panel is mounted, and the imaging lens is set to "wide angle end". FIG. 3B is a cross section schematically illustrating the structure of the imaging lens that is the zoom lens in which the light modulation panel is mounted, and the imaging lens is set to "telephoto end".

As illustrated in FIGS. 3A and 3B, the imaging lens 100 in Example 1 is composed of a first group composed of lenses L1, L2, and L3, a second group composed of lenses L4, L5, L6, and L7, a third group composed of lens L8, a fourth group composed of lenses L9, L10, and L11, and thick parallel flat plate Cg1, which are arranged along optical axis Z1 from the object point side of the imaging lens 100 in the order mentioned above. When the light modulation panel 10 is mounted in the imaging lens 100, the light modulation panel 10 may be arranged in the third group.

Further, the image plane 320S at which an optical image formed through the imaging lens 100 and the light modulation panel 10 is imaged is arranged at a predetermined base detection position on the image-point-side of the imaging lens 100.

Figure 8:
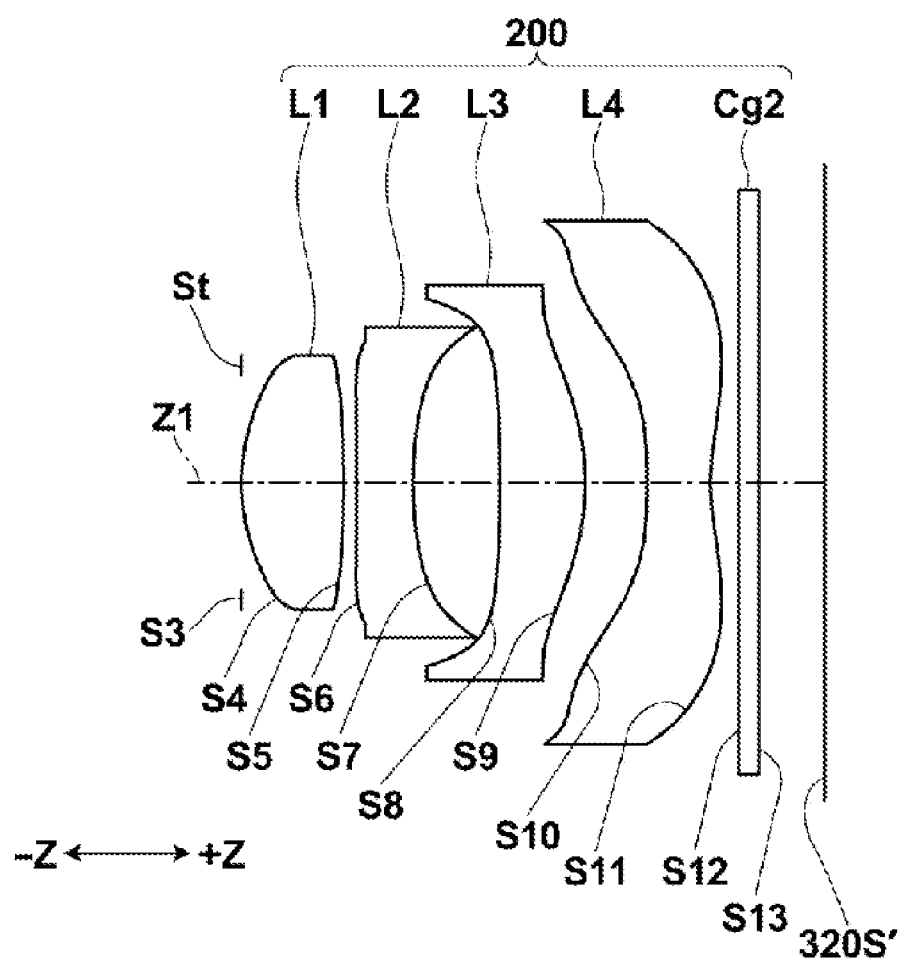
FIG. 8 is a cross section illustrating a state in which a light modulation panel is not mounted in a single-focus imaging lens in Example 2.
Figure 9:
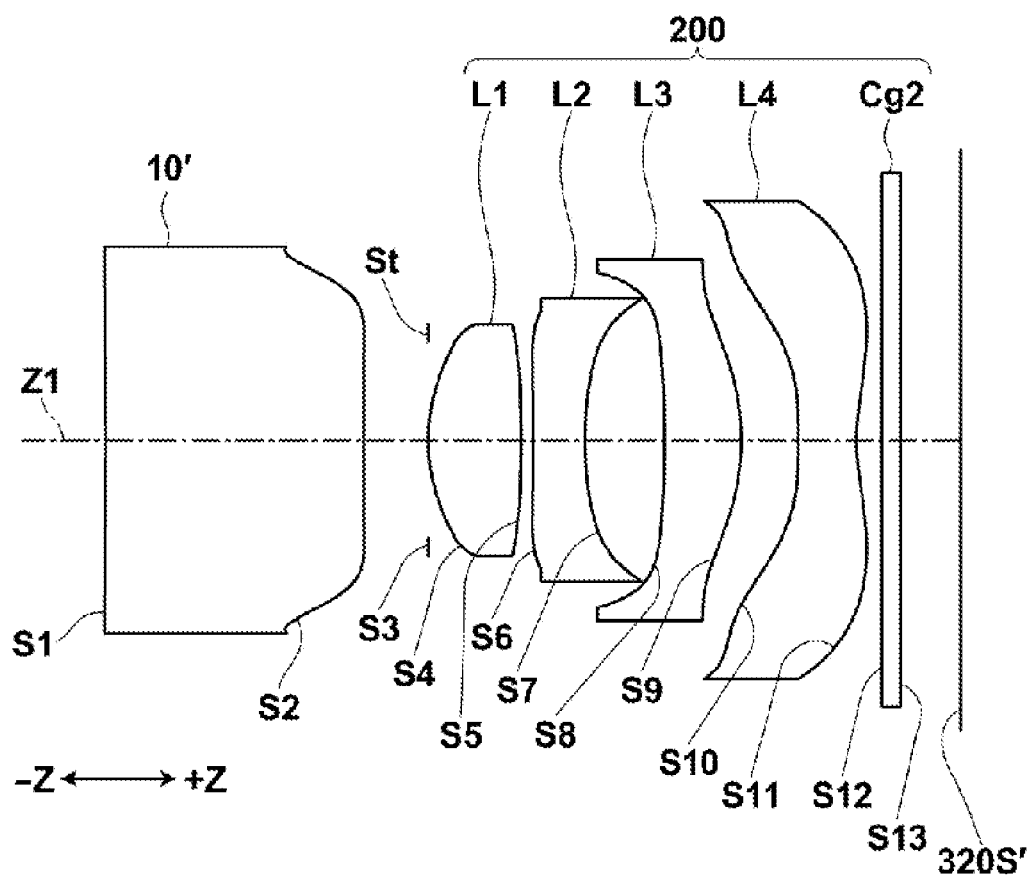
FIG. 9 is a cross section illustrating a state in which a light modulation panel is mounted in the single-focus imaging lens in Example 2.

Meanwhile, FIG. 8 is a cross section schematically illustrating a state in which a light modulation panel 10' is removed from a single-focus imaging lens 200 in Example 2. FIG. 9 is a cross section schematically illustrating a state in which the light modulation panel 10' is mounted in the single-focus imaging lens 200 in Example 2.

As illustrated in FIGS. 8 and 9, the imaging lens 200 of Example 2 is composed of aperture stop St, lens L1, lens L2, lens L3, lens L4 and thin parallel flat plate Cg2, which are arranged along optical axis Z1 from the object point side of the imaging lens 200 in the order mentioned above. When the light modulation panel 10' is mounted in the imaging lens 200, the light modulation panel 10' is arranged on the object point side of the aperture stop St.

Further, the image plane 320S' at which an optical image formed through the imaging lens 200 and the light modulation panel 10' is imaged is arranged at a predetermined base detection position on the image-point-side of the imaging lens 200.

Tables 1A, 1B, and 1C show basic data about the imaging lens 100 of Example 1. Tables 2A, 2B, and 2C show basic data about the imaging lens 200 of Example 2.

Tables 1A and 2A show lens data, and Tables 1B and 2B show brief specification of the imaging lenses. Tables 1C and 2C show coefficients of an aspheric surface equation representing the shape of a lens surface (the shape of an aspheric surface).

In the lens data of Tables 1A and 2A, surface number Si of an optical member, such as a lens, sequentially increases from the object point side toward the image side of the optical system, and the surface number of the i-th surface is Si (i=1, 2, 3, . . . ). The surface numbers Si in Tables 1A and 2A correspond to the signs representing lens surfaces in FIGS. 3A, 3B and 8 and 9. Further, the lens data include the surface number of aperture stop St, the surface numbers of the object-side surface and the image-side surface of parallel flat plates Cg1, Cg2, and the like. Further, the mark "*" in front of a surface number represents that the surface is an aspheric surface.

Here, surface numbers 13 and 14 in Table 1A related to Example 1 correspond to the object-point-side surface of the light modulation panel 10 and the image-point-side surface of the light modulation panel 10. Further, surface numbers 1 and 2 in Table 2A related to Example 2 correspond to the object-point-side surface of the light modulation panel 10' and the image-point-side surface of the light modulation panel 10'.

Further, the sign "Ri" represents the radius of curvature of the i-th surface (i=1, 2, 3, . . . ) (paraxial radius of curvature when the surface is an aspheric surface). Further, the sign "Di" (i=1, 2, 3, . . . ) represents a distance between the i-th surface and the (i+1)-th surface on the optical axis Z1.

In the lens data, Ndj is refractive index of a j-th optical element (j=1, 2, 3, . . . ) with respect to d-line (wavelength is 587.6 nm). The number j sequentially increases from the object side toward the image side. Further, vdj is the Abbe number of the j-th optical element with respect to d-line.

The paraxial radius of curvature and the distance between surfaces are represented by the unit of mm. The paraxial radius of curvature is positive when the surface is convex toward the object side, and negative when the surface is convex toward the image side.

Each aspheric surface is defined by the following aspheric surface equation:

$$Z = \frac{Y^2/R}{1+\left(1-K\frac{Y^2}{R^2}\right)^{1/2}} + \sum_{i=3}^{n} A_i Y^i, \quad \text{[Equation 1]}$$

where

Z: depth of aspheric surface (length of a perpendicular from a point at height Y on an aspheric surface to a flat plane perpendicular to an optical axis, the flat plane being in contact with the vertex of the aspheric surface)(mm), Y: height (distance from the optical axis)(mm), R: paraxial radius of curvature (mm), and K, $A_i$: aspheric coefficients (i=3 through n).

In Tables 1B and 2B, the sign "f" represents the focal length of the entire lens system (combined focal length of lenses in the lens system), and the sign "Fno" represents F-number. Further, the sign "ω" represents a half angle of view. In Table 1B, the sign "D5" represents an air space between the first group G1 and the second group G2, and the sign "D12" represents an air space between the second group G2 and the third group G3. Further, the sign "D15" represents an air space between the third group G3 and the fourth group G4. Further, the sign "D20" represents an air space between the fourth group G4 and optical member Cg1.

Tables 1C and 2C show values of coefficients K, A3, A4, A5 . . . representing each aspheric surface.

TABLE 1A

EXAMPLE 1 - LENS DATA

| Si (SURFACE NUMBER) | Ri (CURVATURE RADIUS) | Di (DISTANCE BETWEEN SURFACES) | Ndj (REFRACTIVE INDEX) | ν dj (Abbe NUMBER) |
|---|---|---|---|---|
| 1 | 35.5376 | 1.00 | 1.92285 | 20.9 |
| 2 | 22.2290 | 4.36 | 1.49700 | 81.5 |
| 3 | −118.8300 | 0.10 | | |
| 4 | 18.7404 | 2.65 | 1.77250 | 49.6 |
| 5 | 52.5352 | D5(VARIABLE) | | |
| 6 | ∞ | 0.61 | 1.88300 | 40.8 |
| 7 | 5.3197 | 2.09 | | |
| *8 | −17.9858 | 0.85 | 1.80348 | 40.4 |
| 9 | 32.6132 | 0.15 | | |
| 10 | 12.2795 | 3.00 | 1.80809 | 22.8 |
| 11 | −6.7230 | 0.59 | 1.90366 | 31.3 |
| 12 | ∞ | D12(VARIABLE) | | |
| *13 | ∞ | 0.5 | 1.51680 | 64.2 |
| 14 | −1300.0 | 2.40 | | |
| *15 | 17.0781 | 1.35 | 1.60595 | 27.0 |
| *16 | 32.0596 | D15(VARIABLE) | | |
| *17 | 12.4248 | 3.20 | 1.47136 | 76.6 |
| *18 | −14.8629 | 0.10 | | |
| 19 | −72.8842 | 0.61 | 1.84666 | 23.8 |
| 20 | 24.9390 | 2.61 | 1.49700 | 81.5 |
| 21 | −14.2724 | D20(VARIABLE) | | |
| 22 | ∞ | 14.95 | 1.51680 | 64.2 |
| 23 | ∞ | | | |

(*Aspheric surface: the value of Ri for an aspheric surface is a paraxial radius of curvature)

(Surface numbers 13, 14 are the surface numbers of a light modulation panel)

TABLE 1B

EXAMPLE 1: BRIEF SPECIFICATION

|  | f | Fno. | 2ω | D5 | D12 | D15 | D20 |
|---|---|---|---|---|---|---|---|
| WIDE ANGLE END | 3.95 | 1.85 | 57.4 | 0.85 | 16.54 | 8.76 | 0.67 |
| TELEPHOTO END | 37.94 | 2.10 | 6.2 | 15.80 | 1.58 | 8.31 | 1.12 |

TABLE 1C

EXAMPLE 1: ASPHERIC SURFACE DATA

| ASPHERIC COEFFICIENT | 8TH SURFACE | 15TH SURFACE | 17TH SURFACE |
|---|---|---|---|
| K | 9.97065200E−01 | 9.94505800E−01 | 1.05945430E+00 |
| A3 | 2.79774810E−05 | 3.04572220E−04 | 2.92967380E−04 |
| A4 | 1.52931150E−04 | −2.53767930E−04 | −1.98278230E−04 |
| A5 | 9.55159270E−06 | 1.84101710E−05 | −2.72191990E−05 |
| A6 | 8.61879860E−07 | −1.66976930E−06 | 8.05027510E−06 |
| A7 | 5.67405560E−07 | −2.41121030E−07 | −1.48143150E−07 |
| A8 | 7.46106420E−08 | −1.47583870E−08 | −6.89974490E−08 |
| A9 | 4.53168120E−09 | −1.71487660E−10 | 7.03525000E−10 |
| A10 | 1.96042570E−10 | 5.24514380E−11 | 1.45519050E−09 |

| ASPHERIC COEFFICIENT | 13TH SURFACE | 16TH SURFACE | 18TH SURFACE |
|---|---|---|---|
| K | 0 | 1.01358050E+00 | 1.07392210E+00 |
| A3 | 1.25741250E−04 | 1.59164090E−04 | 5.61232120E−04 |
| A4 | 2.89207800E−04 | −9.36209020E−05 | −5.27590160E−05 |
| A5 | 2.89455790E−04 | −3.19337180E−05 | 5.42594060E−05 |
| A6 | −1.64317370E−04 | 7.30483550E−06 | −7.32684080E−06 |
| A7 | 3.62888460E−05 | −2.28267650E−07 | 2.43682140E−07 |
| A8 | 1.32032720E−05 | −8.15033290E−08 | 9.45103980E−08 |
| A9 | −1.14618430E−05 | −4.98614820E−09 | 3.91592450E−09 |
| A10 | 3.06425800E−06 | 3.52539990E−10 | −8.69027070E−10 |
| A11 | −2.32782330E−07 | | |
| A12 | −5.28605550E−08 | | |
| A13 | 1.25886470E−08 | | |
| A14 | −7.90793110E−10 | | |

TABLE 2A

EXAMPLE 2 - LENS DATA

| Si (SURFACE NUMBER) | Ri (CURVATURE RADIUS) | Di (DISTANCE BETWEEN SURFACES) | Ndi (REFRACTIVE INDEX) | ν di (Abbe NUMBER) |
|---|---|---|---|---|
| 1 | −220 | 2.00 | 1.43875 | 94.93 |
| *2 | ∞ | 0.57 | | |
| 3 | ∞(STOP) | −0.07 | | |
| *4 | 1.4295 | 0.72 | 1.51007 | 56.26 |
| *5 | −10.5607 | 0.09 | | |
| *6 | −3560.3982 | 0.401 | 1.631715 | 23.26 |
| *7 | 3.0738 | 0.614 | | |
| *8 | −14.5637 | 0.6 | 1.533914 | 55.89 |
| *9 | −2.2483 | 0.44 | | |
| *10 | −7936.115 | 0.451 | 1.533914 | 55.89 |
| *11 | 1.4997 | 0.2 | | |
| 12 | ∞ | 0.145 | 1.51633 | 64.14 |
| 13 | ∞ | 0.462 | | |

(*Aspheric surface: the value of Ri for an aspheric surface is a paraxial radius of curvature)
(Surface numbers 1, 2 are the surface numbers of a light modulation panel)

TABLE 2B

EXAMPLE 2: BRIEF SPECIFICATION

| f = 3.7 | Fno. = 2.8 | 2ω = 62.1 DEGREE |
|---|---|---|

TABLE 2C

EXAMPLE 2: ASPHERIC SURFACE DATA

| ASPHERIC COEFFICIENT | 2ND SURFACE | 4TH SURFACE | 5TH SURFACE |
|---|---|---|---|
| K | 1.00000000E+00 | 4.80860200E−01 | −9.90000000E+01 |
| A3 | | −1.64761930E−02 | 9.04528080E−04 |
| A4 | −3.78631150E−02 | 9.30610320E−02 | −7.24779675E−02 |
| A5 | | −1.46355360E−02 | 5.01124776E−02 |
| A6 | 1.31088810E−01 | −1.18936800E−01 | −7.51388970E−02 |
| A7 | | 4.93211910E−01 | 8.71193976E−02 |
| A8 | 2.27255090E−02 | −4.41161620E−01 | −4.04463803E−01 |
| A9 | | 1.38483140E−01 | 6.07771858E−01 |
| A10 | −2.50161130E−01 | 1.55976890E−01 | −3.28037069E−01 |
| A11 | | −6.43034030E−02 | 6.56019718E−03 |
| A12 | 1.32656350E−01 | −2.29547100E−01 | 1.08691980E−01 |
| A13 | | −3.67825050E−01 | 2.23053931E−01 |
| A14 | −1.80456640E−02 | −3.49450600E−01 | 2.61298580E−01 |
| A15 | | 1.04759730E−01 | 4.84979419E−02 |
| A16 | | 1.40736670E+00 | −7.28870883E−01 |

| ASPHERIC COEFFICIENT | 6TH SURFACE | 7TH SURFACE | 8TH SURFACE |
|---|---|---|---|
| K | −4.90458202E+01 | −2.83290350E+00 | −1.00009986E+01 |
| A3 | −1.58476808E−02 | 3.21047117E−02 | −7.25475307E−03 |
| A4 | 1.48049714E−02 | −1.21826054E−01 | −1.03188048E−01 |
| A5 | −8.05170927E−02 | 5.00346204E−01 | 1.02077832E−01 |
| A6 | 2.64204799E−01 | −4.58560349E−01 | 1.88566543E−01 |
| A7 | −4.77849019E−01 | −1.77167618E−01 | −3.43937058E−01 |
| A8 | −1.75563939E−01 | 2.80242487E−01 | −5.98369831E−02 |
| A9 | 1.29070090E+00 | 4.84426546E−01 | 3.44525639E−01 |
| A10 | −7.59419392E−01 | −3.83264672E−01 | −1.77389456E−01 |

| ASPHERIC COEFFICIENT | 9TH SURFACE | 10TH SURFACE | 11TH SURFACE |
|---|---|---|---|
| K | −8.81760316E+01 | −9.90000000E+01 | −1.20312985E+01 |
| A3 | −3.39484951E−01 | −2.71755243E−01 | −1.08379974E−01 |
| A4 | 5.72764788E−02 | −5.90727446E−02 | 8.72770088E−04 |
| A5 | 2.17990290E−01 | −2.16683473E−02 | −4.70643862E−02 |
| A6 | −8.25456868E−02 | 6.11218856E−02 | 8.52184240E−02 |
| A7 | −5.82877108E−02 | 4.69863329E−02 | −6.32271800E−02 |
| A8 | 2.71448000E−02 | −1.36563977E−02 | 9.84405405E−03 |
| A9 | 4.94763014E−02 | −8.58281425E−03 | 9.21629655E−03 |
| A10 | −2.84948603E−02 | 5.81272387E−04 | −3.39052533E−03 |

Figure 4B:
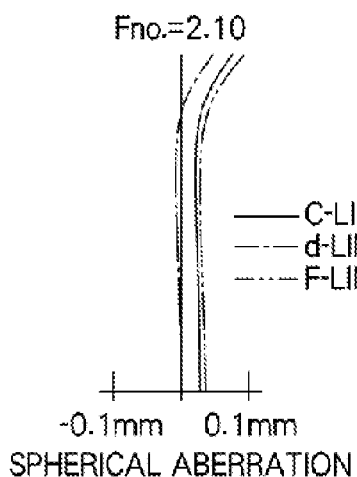
FIG. 4Ba is a diagram illustrating spherical aberration of the imaging lens in Example 1 that is set to telephoto end without a light modulation panel.
Figure 4B:
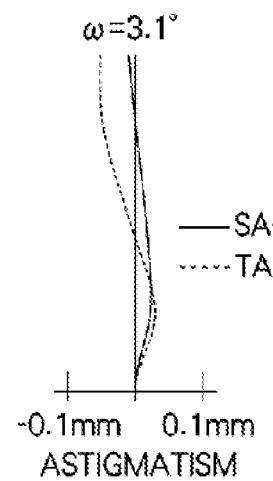
Figure 4B:
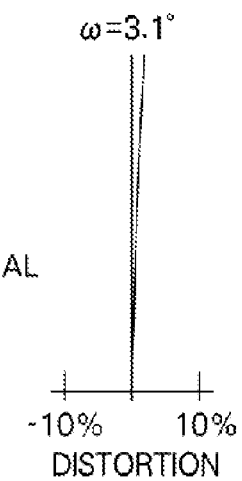
Figure 5A:
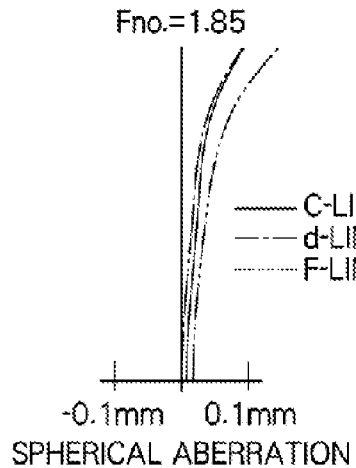
FIG. 5Aa is a diagram illustrating spherical aberration of the imaging lens in Example 1 that is set to wide angle end with a light modulation panel mounted therein.
Figure 5A:
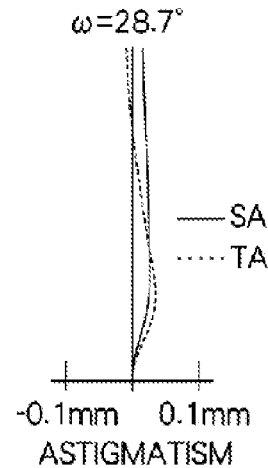
Figure 5A:
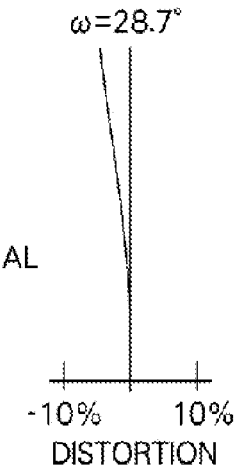
Figure 5B:
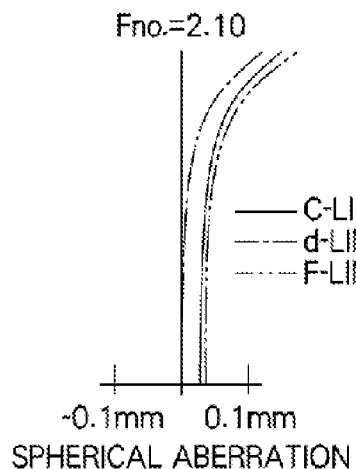
FIG. 5Ba is a diagram illustrating spherical aberration of the imaging lens in Example 1 that is set to telephoto end with a light modulation panel mounted therein.
Figure 5B:
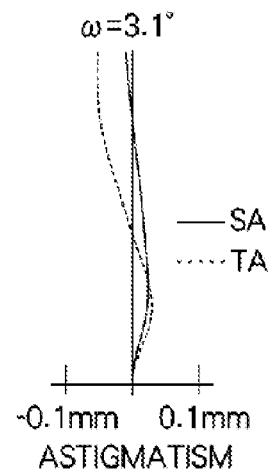
Figure 5B:
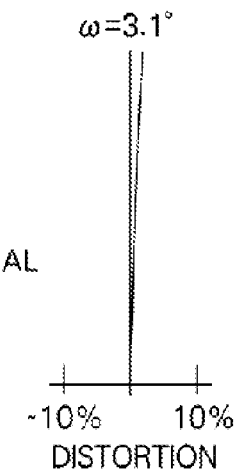

FIGS. 4Aa through 4Ac, FIGS. 4Ba through 4Bc, FIGS. 5Aa through 5Ac, and FIGS. 5Ba through 5Bc are diagrams illustrating various aberrations related to the imaging lens 100 of Example 1. FIGS. 4Aa through 4Ac illustrate various aberrations of the imaging lens 100 that is set to wide angle end, and in which a light modulation panel is not mounted. FIGS. 4Ba through 4Bc illustrate various aberrations of the imaging lens 100 that is set to telephoto end, and in which a light modulation panel is not mounted. FIGS. 5Aa through 5Ac illustrate various aberrations of the imaging lens 100 that is set to wide angle end, and in which a light modulation panel is mounted. FIGS. 5Ba through 5Bc illustrate various aberrations of the imaging lens 100 that is set to telephoto end, and in which a light modulation panel is mounted.

Further, FIGS. 10a through 10c and FIGS. 11a through 11c are diagrams illustrating various aberrations related to the imaging lens 200 of Example 2. FIGS. 10a through 10c illustrate various aberrations of the imaging lens 200 in which a light modulation panel is not mounted. FIGS. 11a through 11c illustrate various aberrations of the imaging lens 200 in which a light modulation panel is mounted.

FIGS. 4Aa, 4Ba, 5Aa, 5Ba, 10a and 11a, on the left side, illustrate spherical aberrations. FIGS. 4Ab, 4Bb, 5Ab, 5Bb, 10b and 11b, at the center, illustrate astigmatism. FIGS. 4Ac, 4Bc, 5Ac, 5Bc, 10c and 11c, on the right side, illustrate distortion. The diagrams illustrating distortion show shift amounts (difference) from ideal image height f×tan θ when the focal length of the entire lens system is f, and the half angle of view is θ (variable, $0 \leq \theta \leq \omega$).

In the diagrams illustrating spherical aberrations, spherical aberrations with respect to d-line (587.6 nm) are represented by solid lines, and spherical aberrations with respect to F-line (486.1 nm) are represented by dot-dashed lines. Further, spherical aberrations with respect to C-line (656.3 nm) are represented by two-dot-dashed lines.

Figure 6A:
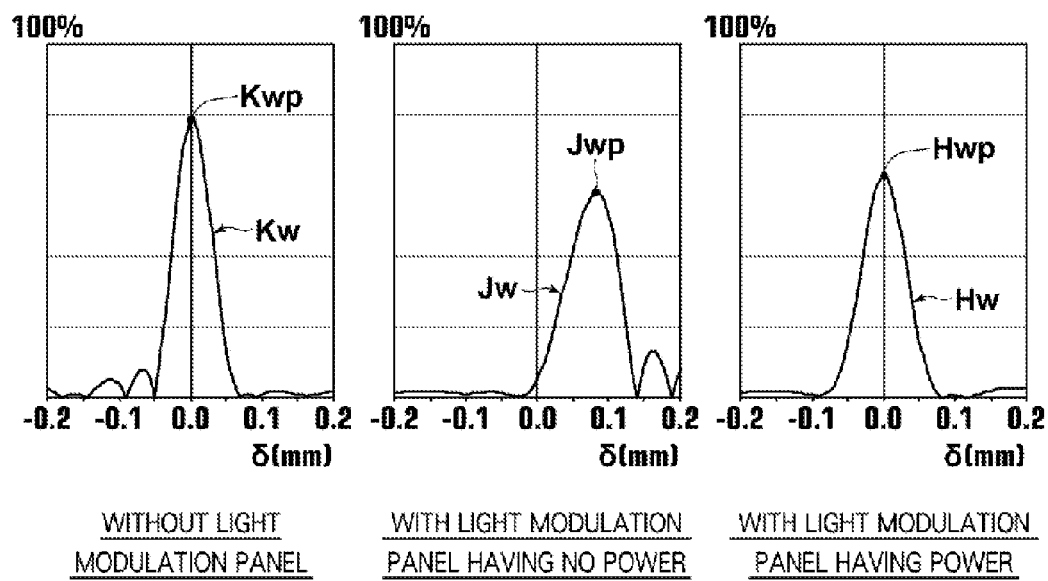
FIG. 6Aa is a diagram illustrating a defocus MTF curve of the imaging lens in Example 1 that is set to wide angle end without a light modulation panel.
Figure 6B:
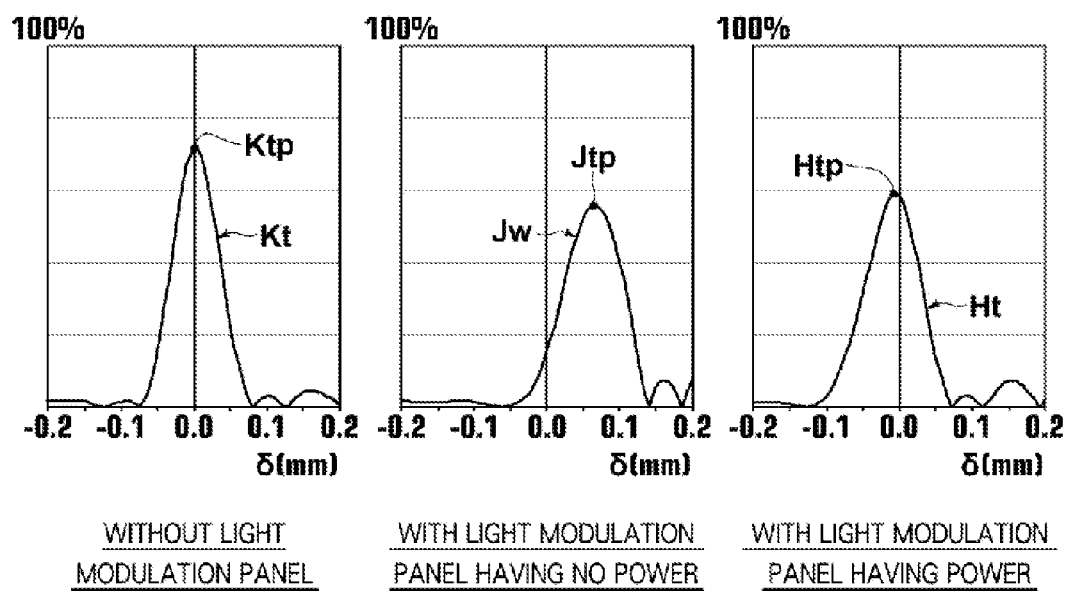
FIG. 6Ba is a diagram illustrating a defocus MTF curve of the imaging lens in Example 1 that is set to telephoto end without a light modulation panel.
Figure 12A:
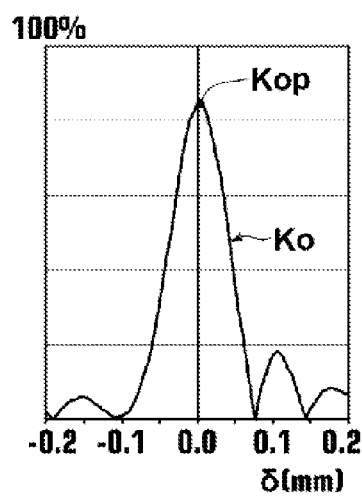
FIG. 12a is a diagram illustrating a defocus MTF curve of the single-focus imaging lens in Example 2 without a light modulation panel.
Figure 12B:
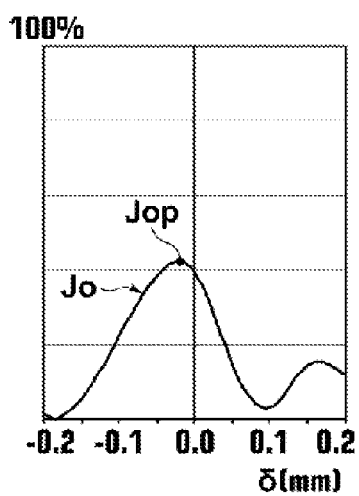
FIG. 12b is a diagram illustrating a defocus MTF curve of the single-focus imaging lens in Example 2 with a light modulation panel having no power.
Figure 12C:
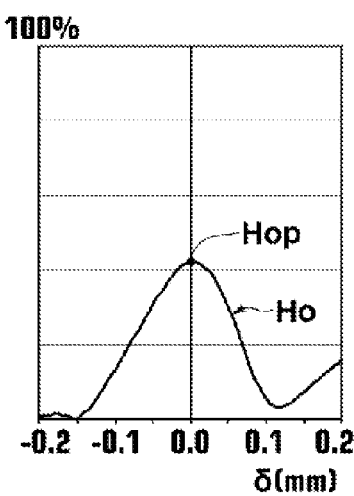
FIG. 12c is a diagram illustrating a defocus MTF curve of the single-focus imaging lens in Example 2 with a light modulation panel having power.

In FIGS. 6Aa through 6Ac, FIGS. 6Ba through 6Bc, and FIGS. 12a through 12c, curves representing defocus MTF are illustrated in a coordinate system defined by a vertical axis representing the values of MTF and a horizontal axis representing defocus amount δ. These diagrams illustrate the values of defocus MTF at 50 line/mm when the position of the image plane is a position at which the defocus amount δ is ±0.

FIGS. 6Aa through 6Ac illustrate curves representing defocus MTF when the imaging lens of Example 1 is set to wide angle end. FIG. 6Aa on the left side illustrates curve Kw, which represents the defocus MTF of the imaging lens in which a light modulation panel is not mounted. FIG. 6Ac on the right side illustrates curve Hw, which represents the defocus MTF of the imaging lens in which a light modulation panel having power is mounted. FIG. 6Ab at the center illustrates curve Jw, which represents the defocus MTF of the imaging lens in which a light modulation panel that does not have power is mounted.

Further, the peak position of the defocus MTF represented by the curve Kw is Kwp, and the peak position of the defocus MTF represented by the curve Hw is Hwp. The peak position of the defocus MTF represented by the curve Jw is Jwp.

FIGS. 6Ba through 6Bc illustrate curves representing defocus MTF when the imaging lens of Example 1 is set to telephoto end. FIG. 6Ba on the left side illustrates curve Kt, which represents the defocus MTF of the imaging lens in which a light modulation panel is not mounted. FIG. 6Bc on the right side illustrates curve Ht, which represents the defocus MTF of the imaging lens in which a light modulation panel having power is mounted. FIG. 6Bb at the center illustrates curve Jt, which represents the defocus MTF of the imaging lens in which a light modulation panel that does not have power is mounted.

Further, the peak position of the defocus MTF represented by the curve Kt is Ktp, and the peak position of the defocus MTF represented by the curve Ht is Htp. The peak position of the defocus MTF represented by the curve Jt is Jtp.

FIGS. 12a through 12c illustrate curves representing defocus MTF of the imaging lens of Example 2. FIG. 12a on the left side illustrates curve Ko, which represents the defocus MTF of the imaging lens in which a light modulation panel is not mounted. FIG. 12c on the right side illustrates curve Ho, which represents the defocus MTF of the imaging lens in which a light modulation panel having power is mounted. FIG. 12b at the center illustrates curve Jo, which represents the defocus MTF of the imaging lens in which a light modulation panel that does not have power is mounted.

Further, the peak position of the defocus MTF represented by the curve Ko is Kop, and the peak position of the defocus MTF represented by the curve Ho is Hop. The peak position of the defocus MTF represented by the curve Jo is Jop.

In FIGS. 6Aa through 6Ac and FIGS. 6Ba through 6Bc, curves representing defocus MTF illustrated in FIG. 2, which has been described already, are illustrated separately. Further, in FIGS. 12a through 12c, curves representing defocus MTF illustrated in FIG. 2 are illustrated separately. Therefore, explanations of these diagrams will be omitted, because they are similar to those of FIG. 2.

The present invention is not limited to the embodiments and the examples described in the specification of the present application. Various modifications are possible without departing from the gist of the present invention. For example, the values of the radius of curvature of each lens, a distance between surfaces, a refractive index, and the like are not limited to the numerical values in the tables, and may be other values.

What is claimed is:

1. A light modulation panel to be inserted into an optical path of an imaging lens composed of an image-forming optical system to make the imaging lens function as a depth-of-field-extended optical system, wherein the light modulation panel has power that makes a peak position of defocus MTF related to the image-forming optical system when the imaging lens is used alone to function as the image-forming optical system and a peak position of defocus MTF related to the depth-of-field-extended optical system when the imaging lens functions as the depth-of-field-extended optical system by insertion of the light modulation panel into the optical path of the imaging lens coincide with each other.

2. A light modulation panel, as defined in claim 1, wherein the light modulation panel is inserted to a position near a pupil of the imaging lens.

3. A light modulation panel, as defined in claim 2, wherein the light modulation panel is a single lens.

4. An imaging lens, wherein the light modulation panel, as defined in claim 2, is mountable, the imaging lens comprising:
a detachably-holding unit that holds the light modulation panel in a detachable manner.

5. An imaging lens, wherein the light modulation panel, as defined in claim 3, is mountable, the imaging lens comprising:
a detachably-holding unit that holds the light modulation panel in a detachable manner.

6. An imaging lens, wherein the light modulation panel, as defined in claim 3, is mountable, and
wherein the imaging lens is a zoom lens.

7. An imaging lens, as defined in claim 6, comprising:
a positive first group that is fixed during zooming;
a negative second group that moves during zooming;
a third group that is fixed during zooming; and
a positive fourth group that moves during zooming, which are arranged from the object point side of the imaging lens in the order mentioned above,
wherein the light modulation panel is mountable between the second group and the third group or in the third group.

8. An imaging lens, as defined in claim 7, further comprising:
a detachably-holding unit that holds the light modulation panel in a detachable manner.

9. An imaging lens, wherein the light modulation panel, as defined in claim 2, is mountable, and
wherein the imaging lens is a zoom lens.

10. An imaging lens, as defined in claim 9, comprising:
a positive first group that is fixed during zooming;
a negative second group that moves during zooming;
a third group that is fixed during zooming; and
a positive fourth group that moves during zooming, which are arranged from the object point side of the imaging lens in the order mentioned above,
wherein the light modulation panel is mountable between the second group and the third group or in the third group.

11. An imaging lens, as defined in claim 10, further comprising:
a detachably-holding unit that holds the light modulation panel in a detachable manner.

12. A light modulation panel, as defined in claim 1, wherein the light modulation panel is a single lens.

13. An imaging lens, wherein the light modulation panel, as defined in claim 12, is mountable, the imaging lens comprising:
a detachably-holding unit that holds the light modulation panel in a detachable manner.

14. An imaging lens, wherein the light modulation panel, as defined in claim 12, is mountable, and
wherein the imaging lens is a zoom lens.

15. An imaging lens, as defined in claim 14, comprising:
a positive first group that is fixed during zooming;
a negative second group that moves during zooming;
a third group that is fixed during zooming; and
a positive fourth group that moves during zooming, which are arranged from the object point side of the imaging lens in the order mentioned above,
wherein the light modulation panel is mountable between the second group and the third group or in the third group.

16. An imaging lens, as defined in claim 15, further comprising:

a detachably-holding unit that holds the light modulation panel in a detachable manner.

17. An imaging lens, wherein the light modulation panel, as defined in claim 1, is mountable, the imaging lens comprising:
a detachably-holding unit that holds the light modulation panel in a detachable manner.

18. An imaging lens, wherein the light modulation panel, as defined in claim 1, is mountable, and
wherein the imaging lens is a zoom lens.

19. An imaging lens, as defined in claim 18, comprising:
a positive first group that is fixed during zooming;
a negative second group that moves during zooming;
a third group that is fixed during zooming; and
a positive fourth group that moves during zooming, which are arranged from the object point side of the imaging lens in the order mentioned above,
wherein the light modulation panel is mountable between the second group and the third group or in the third group.

20. An imaging lens, as defined in claim 19, further comprising:
a detachably-holding unit that holds the light modulation panel in a detachable manner.

* * * * *